US010642635B2

(12) United States Patent
Holla et al.

(10) Patent No.: US 10,642,635 B2
(45) Date of Patent: May 5, 2020

(54) DECENTRALIZED DEMAND-BASED VIRTUAL MACHINE MIGRATION MANAGEMENT

(71) Applicant: VMware, Inc., Palo Alto, CA (US)

(72) Inventors: Aditya G. Holla, Palo Alto, CA (US); Ajay Bharadwaj Shamarao Venkata Rao, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 375 days.

(21) Appl. No.: 14/298,904

(22) Filed: Jun. 7, 2014

(65) Prior Publication Data

US 2015/0355924 A1 Dec. 10, 2015

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC .................................................. G06F 9/45533
USPC ........................................................... 718/1
See application file for complete search history.

(56) References Cited

U.S. PATENT DOCUMENTS

| 8,520,676 | B2 * | 8/2013 | Shaffer | H04L 1/1854 |
| | | | | 370/329 |
| 8,701,107 | B2 * | 4/2014 | Gulati | G06F 9/5088 |
| | | | | 718/1 |
| 9,036,504 | B1 * | 5/2015 | Miller | H04L 41/0816 |
| | | | | 370/254 |
| 2005/0251802 | A1 * | 11/2005 | Bozek | G06F 9/5077 |
| | | | | 718/1 |
| 2009/0177756 | A1 * | 7/2009 | Gunda | H04L 67/1097 |
| | | | | 709/216 |
| 2010/0050172 | A1 * | 2/2010 | Ferris | G06F 9/4856 |
| | | | | 718/1 |
| 2010/0242045 | A1 * | 9/2010 | Swamy | G06F 9/455 |
| | | | | 718/104 |
| 2011/0185064 | A1 * | 7/2011 | Head | G06F 9/5077 |
| | | | | 709/226 |
| 2011/0202640 | A1 * | 8/2011 | Pillutla | G06F 9/4856 |
| | | | | 709/221 |
| 2011/0231680 | A1 * | 9/2011 | Padnnanabhan | G06F 1/3209 |
| | | | | 713/310 |
| 2012/0030686 | A1 * | 2/2012 | Mukherjee | G06F 9/5077 |
| | | | | 718/105 |

(Continued)

OTHER PUBLICATIONS

Unknown, "VMware Security Hardening Guides", accessed at <<http://www.vmware.com/security/hardening-guides>>, accessed on Apr. 30, 2014, 3 pages.

*Primary Examiner* — Mehran Kamran
(74) *Attorney, Agent, or Firm* — Patterson + Sheridan, LLP

(57) ABSTRACT

Embodiments perform decentralized virtual machine (VM) migration decisions. By comparing a set of VM-specific rules with current statistics (e.g., resource usage), one host determines whether to migrate the VM and lazily selects another host to receive the VM. The rules define, for example, threshold values for resource usage. The host makes the migration decision and performs the migration without input from a centralized server. In this manner, migration decisions are offloaded to migration modules executing on each host for reactive and/or proactive migration. Proactive migration involves migrating a VM before the VM violates its rules.

19 Claims, 7 Drawing Sheets

(56) References Cited

U.S. PATENT DOCUMENTS

| | | | | |
|---|---|---|---|---|
| 2012/0113986 | A1* | 5/2012 | Shaffer | H04L 1/1854 370/390 |
| 2012/0151057 | A1* | 6/2012 | Paredes | H04L 12/4641 709/225 |
| 2012/0311568 | A1* | 12/2012 | Jansen | G06F 9/45558 718/1 |
| 2013/0152076 | A1* | 6/2013 | Patel | G06F 9/45558 718/1 |
| 2013/0227710 | A1* | 8/2013 | Barak | G06F 21/10 726/29 |
| 2013/0254081 | A1* | 9/2013 | Kurabayashi | G06Q 30/04 705/34 |
| 2013/0283364 | A1* | 10/2013 | Chang | H04L 49/70 726/12 |
| 2013/0297903 | A1* | 11/2013 | Kaneko | G06F 3/0605 711/165 |
| 2013/0318532 | A1* | 11/2013 | Kikuchi | G06F 9/48 718/102 |
| 2013/0326507 | A1* | 12/2013 | McGrath | G06F 9/4856 718/1 |
| 2013/0332515 | A1* | 12/2013 | Jimenez | H04L 67/10 709/203 |
| 2013/0339956 | A1* | 12/2013 | Murase | G06F 9/505 718/1 |
| 2013/0346973 | A1* | 12/2013 | Oda | G06F 9/4856 718/1 |
| 2014/0040886 | A1* | 2/2014 | Coles | G06F 9/4401 718/1 |
| 2014/0053151 | A1* | 2/2014 | Heninger | G06F 9/5083 718/1 |
| 2014/0068608 | A1* | 3/2014 | Kulkarni | G06F 9/45558 718/1 |
| 2014/0108665 | A1* | 4/2014 | Arora | H04L 67/141 709/227 |
| 2014/0156557 | A1* | 6/2014 | Zeng | G06Q 10/0631 705/348 |
| 2014/0214915 | A1* | 7/2014 | Dragon | H04L 43/04 709/201 |
| 2014/0283051 | A1* | 9/2014 | Doron | H04L 63/1458 726/23 |
| 2014/0325515 | A1* | 10/2014 | Salmela | G06F 9/45533 718/1 |
| 2015/0052528 | A1* | 2/2015 | French | G06F 9/4856 718/1 |
| 2015/0058844 | A1* | 2/2015 | Conklin | G06F 9/45558 718/1 |
| 2015/0143364 | A1* | 5/2015 | Anderson | G06F 9/5088 718/1 |
| 2015/0143367 | A1* | 5/2015 | Jia | G06F 9/45533 718/1 |
| 2015/0169349 | A1* | 6/2015 | Joffe | G06F 9/45558 718/1 |
| 2015/0339156 | A1* | 11/2015 | Vincent | G06F 9/4856 718/1 |

* cited by examiner

DECENTRALIZED DEMAND-BASED VIRTUAL MACHINE MIGRATION MANAGEMENT

BACKGROUND

Some existing systems enable the transfer of virtual machines (VMs) from one host to another host. Referred to as migration, these existing systems rely on a centralized server to manage the migration. For example, the centralized server maintains statistics received periodically from each of the hosts, such as resource utilization (e.g., processor, memory, power, etc.), overload condition, underload condition, the quantity of executing VMs, statistics associated with each of the VMs, and more. Using these statistics, the centralized server makes migration decisions and coordinates the migrations of the VMs from one host to another.

While advantageous in some scenarios, the existing centralized approach has drawbacks. For example, the centralized approach is subject to a single point of failure such that migration fails if the server running the centralized logic fails. Further, the validity, applicability, and usefulness of the migration decisions depends on the tuning of the time gap associated with the statistics gathered from the hosts. That is, the centralized server may rely on stale statistics when making migration decisions resulting in decisions that have less benefit to the datacenter.

In some other existing systems, a pool of hosts continually synchronize their status with each other to enable migration decisions. While the statistics are kept current in these systems, the increased amount of network traffic required to support the continual status updates produces slower network response times, increased likelihood of failure, and increased costs.

SUMMARY

One or more embodiments described herein perform decentralized virtual machine (VM) migration decisions. A first host computing device maintains a status of a plurality of VMs executing on the first host computing device. Each of the VMs has associated therewith a set of rules. The first host computing device compares the status of each of the VMs to the associated set of rules and determines whether at least one of the rules has been violated for at least one of the VMs. Upon determining that at least one of the rules has been violated, the first host computing device selects a second host computing device from a plurality of host computing devices to which to migrate the VMs. The first host computing device performs the selection by communicating with the plurality of host computing devices. The first host computing device initiates migration of the VMs to the second host computing device, without input from a centralized server.

In some embodiments, the first host computing device maintains resource usage for a plurality of the VMs hosted by the first host computing device. Each of the VMs has associated therewith a set of threshold values. The first host computing device receives notification of an availability of a second host computing device. The notification describes resource capabilities associated with the second host computing device. For each of the VMs, the first host computing device compares the resource usage to the associated set of threshold values. Upon determining that the resource usage for at least one of the VMs is nearing the associated threshold values, the first host computing device initiates migration of the VMs from the first host computing device to the second host computing device.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
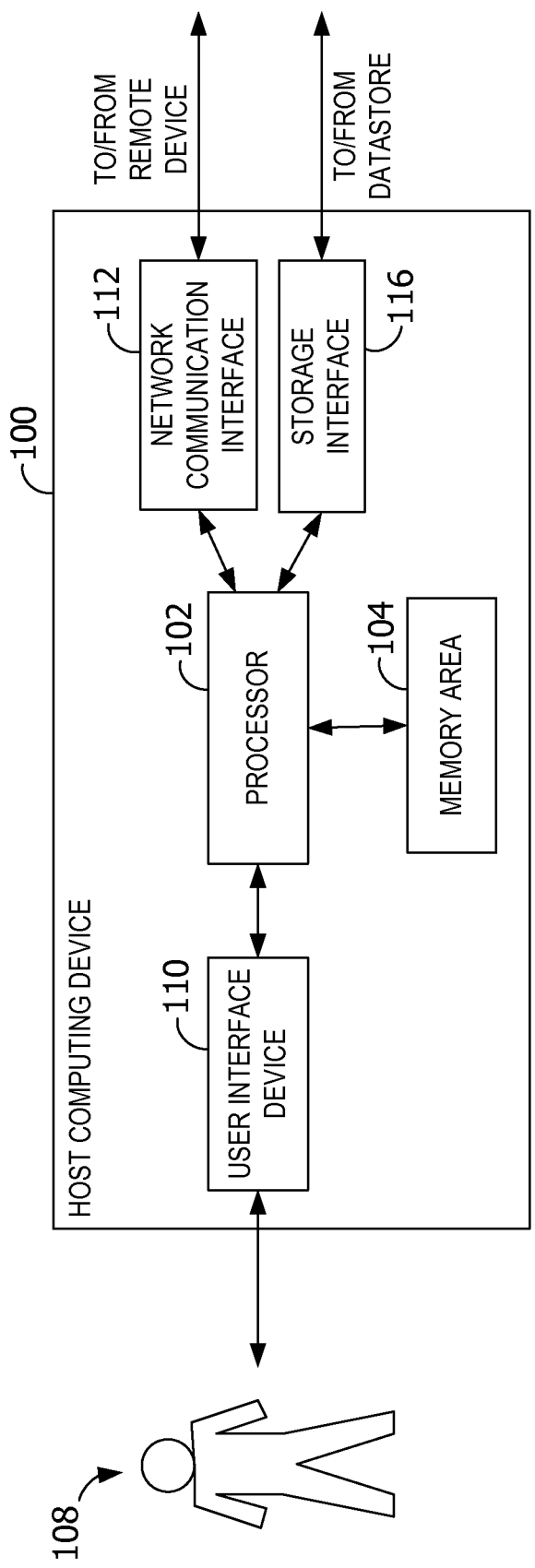
FIG. 1 is a block diagram of an exemplary host computing device.

Embodiments described herein implement decentralized migration management for virtual machine (VMs) 235. In some embodiments, upon determining that migration of a VM 235 should occur, a lazy migration scheme is performed to find a target host computing device to receive VM 235. Rather than relying on centralized logic, aspects of the disclosure enable migration modules in each of a plurality of host computing devices 100 to perform migration decisions and communicate with each other using a standard protocol. In some embodiments, the migration modules execute in kernel space, such as in a hypervisor or other VM manager, in each host computing device 100. In this manner, migration logic is offloaded to the migration modules for reactive and/or proactive migration. In some embodiments, host computing devices 100 make migration decisions based on defined rules in view of a status of each host computing device 100 and/or VM 235.

Embodiments of the disclosure facilitate migration of VMs 235 in various scenarios. For example, when a centralized server, such as vCenter server from VMware, Inc., fails, aspects of the disclosure enable host computing devices 100 to perform migration decisions in the absence of the centralized server. Aspects of the disclosure are thus not subject to a single point of failure. Further, migration is enabled between hosts not managed by the same centralized server, or to/from a host computing device 100 not managed by a centralized server at all. Aspects of the disclosure thus enable migration with or without the intervention of the centralized server. Further, when a new host computing device 100 joins a subnet or become underutilized, this host computing device 100 may acquire VMs 235 from other host computing devices 100 thereby reducing the load on those host computing devices 100. By using the protocol recognized by host computing devices 100, any component executing on (or off) the host computing devices 100 may proactively recommend migration based on the criteria described herein, or other criteria (e.g., different algorithms implemented by those components).

In some embodiments, migration decisions are made locally in each host computing device 100 based on statistics from that host computing device 100, in contrast to the multiple message exchanges associated with the centralized server approaches (e.g., to synchronize a global view among host computing devices 100 and the centralized server). That is, some embodiments do not need to maintain a global view of the other host computing devices 100, thereby reducing and/or eliminating network traffic among the host computing devices 100 (e.g., eliminating central collection of VM statistics). The migration decision in such embodiments are made by host computing device 100 based solely on a current status of rules 406 for VMs 235 on that host computing device 100 and/or rules associated with that host computing device 100. In contrast, the centralized approaches organize hosts into well-formed networks to enable frequent sharing of usage statistics even when migration decisions are not being made.

In some embodiments, the lazy migration scheme includes one hypervisor deciding to migrate a VM 235, and then lazily asking other hypervisors if they are willing to receive VM 235 or swap VM 235 for one of their own. Hypervisors, and virtualized environments, are next described.

FIG. 1 is a block diagram of an exemplary host computing device 100. Host computing device 100 includes a processor 102 for executing instructions. In some embodiments, executable instructions are stored in a memory or other memory area 104. Memory area 104 is any device allowing information, such as executable instructions and/or other data, to be stored and retrieved. For example, memory area 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
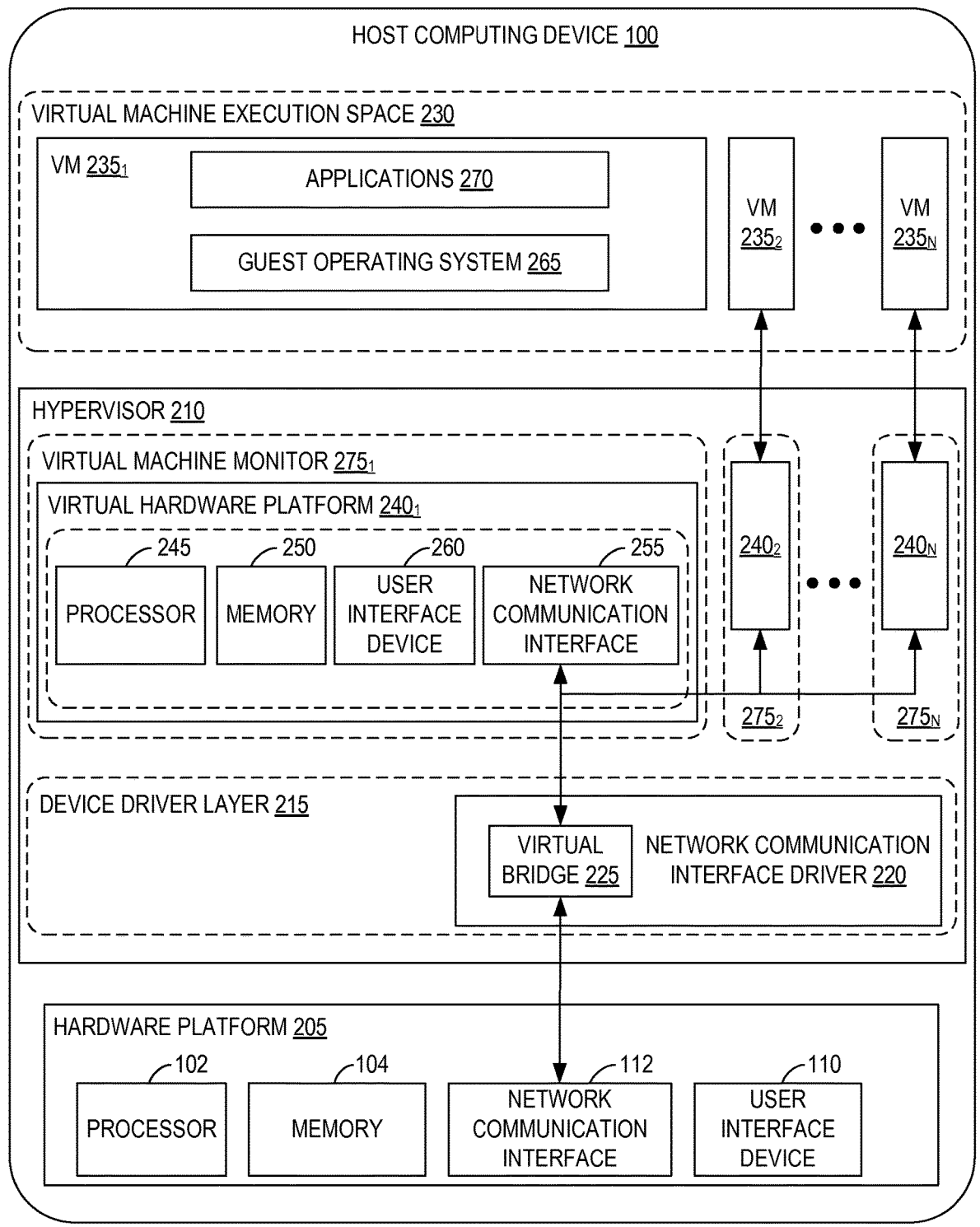
FIG. 2 is a block diagram of virtual machines that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory area 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory area 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such embodiments, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
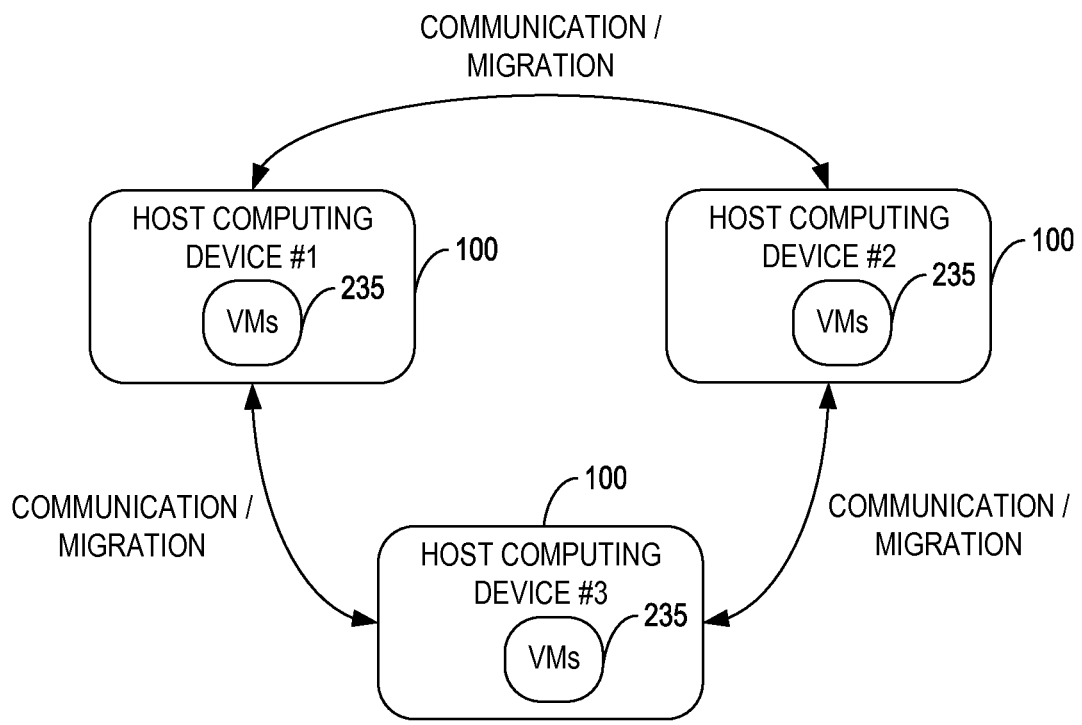
FIG. 3 is a block diagram of host computing devices communicating with each other, such as for coordinating migration of virtual machines.

FIG. 3 is a block diagram of host computing devices 100 communicating with each other, such as for coordinating migration of VMs 235. Each of host computing devices 100 has the capability of communicating with each of the other host computing devices 100. In the example of FIG. 3, the communication among host computing devices 100 includes communications regarding migration of at least one VM 235 from one of host computing devices 100 to another of host computing devices 100. As described herein, host computing devices 100 make migration decisions independently of any centralized server, such as vCenter from VMware, Inc. The migration decisions include decisions about which VMs 235 to migrate, when to migrate the VMs 235, and to which host computing device 100 to migrate the VMs 235.

Communication among host computing devices 100 may occur using any means for communication, such as a network. Aspects of the disclosure are operable with any network type or configuration.

Any of host computing devices 100 may correspond to a first host computing device, a second host computing device, a source host computing device, and a target host computing device. Any of host computing devices 100 are capable of performing the operations described herein without a root node, central server, or other centralized management system for migration management.

Aspects of the disclosure are not reliant on a constant flow of messages among host computing devices 100 (e.g., exchanging resource usage regularly). Rather, communications are sent only when one of host computing devices 100 is searching for a target host computing device or is migrating one of VMs 235. For example, none of host computing devices 100 may not even be aware of the existence of other host computing devices 100 until migration is triggered. That is, none of host computing devices 100 has a global view of the subnet (e.g., the states of the other host computing devices 100). The subnet refers to a subnetwork of the network layer (e.g. layer 3), in some examples. In this lazy approach, one hypervisor finds other hypervisors on demand. Embodiments of the disclosure are operable without a well-formed peer-to-peer network, without a well-formed cluster, and without maintain a subnet-wide or cluster-wide status. Lazily finding the target host eliminates the periodic message exchange (e.g., containing statistics updates) associated with centralized approaches.

Migration involves moving at least one of VMs 235 from one host computing device 100 to another host computing device 100. Moving VM 235 includes transferring files and/or other data describing VM 235, such as its last or current state, data files, configuration information, and the like. VM 235 may either be executing (e.g., a live migration) or not executing.

Figure 4:
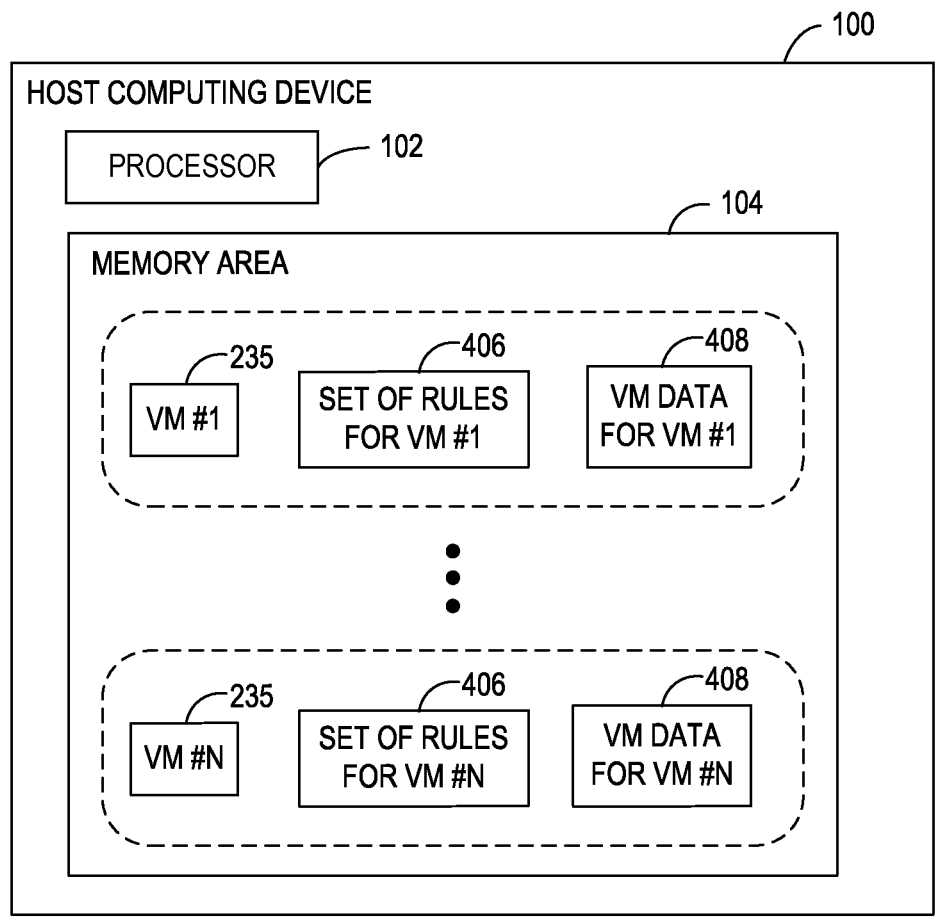
FIG. 4 is a block diagram of an exemplary host computing device executing a plurality of virtual machines and storing rules and data associated with each of the virtual machines.

FIG. 4 is a block diagram of host computing device 100 executing a plurality of VMs 235 and storing rules 406 and data associated with each of VMs 235. Host computing device 100 represents any device executing instructions (e.g., as application programs, operating system functionality, or both) to implement the operations and functionality described herein. For example, host computing device 100 executes instructions to implement the operations illustrated in FIG. 5 and FIG. 7. Host computing device 100 may include any computing device or processing unit. For example, host computing device 100 may represent a group of processing units or other computing devices, such as in a cloud computing configuration.

Host computing device 100 has at least one processor 102 and memory area 104. Processor 102 includes any quantity of processing units, and is programmed to execute computer-executable instructions for implementing aspects of the disclosure. The instructions may be performed by processor 102 or by multiple processors executing within host computing device 100, or performed by a processor external to host computing device 100. In some embodiments, processor 102 is programmed to execute instructions such as those illustrated in the figures to implement decentralized management of VM migration.

Memory area 104 includes any quantity of computer-readable media associated with or accessible by host computing device 100. Memory area 104, or portions thereof, may be internal to host computing device 100, external to host computing device 100, or both.

For example, memory area 104 further stores a plurality of VMs 235, such as VM #1 through VM # N. Further, for each of VMs 235, memory area 104 stores VM data 408 and a set of rules 406. VM data 408 represents a state of VM 235. Exemplary VM data 408 for one of VMs 235 describes a status of VM 235, resource usage by VM 235, a VM identifier associated with VM 235, and/or a size of VM 235. Exemplary resource usage may correspond to current or historical usage of memory, processing, and/or network bandwidth.

The set of rules 406 represent thresholds, limits, constraints, or other conditions specific to each VM 235. For example, rules 406 are specific to the resources of each VM 235, rather than cluster (or subnet) averages (e.g., average resource use). In this manner, migration is triggered specific to the conditions of each individual VM 235 (e.g., flexible and tailored to each VM 235). Exemplary rules 406 define threshold values (e.g., upper limits) for resource utilization for each VM 235 (e.g., specific to each VM 235).

Rules 406 may be defined, or adjusted, by users of VMs 235, an administrator, the VMs 235 themselves, or other means (e.g., default rules). Host computing device 100 may apply default rules, with default threshold values, to VMs 235 lacking explicitly defined rules 406. Rules 406 may also be overridden by the administrator, such as to disable rule-based migration.

One or more of rules 406 may also have a validity time or expiration time associated therewith. For example, expiration dates associated with rules 406 may be defined based on expiration dates associated with service level agreements (SLA) for VMs 235 (e.g., agreements between the users and a cloud computing platform for particular services, guarantees, etc.). Aspects of the disclosure may translate each of rules 406 to a particular kernel state to monitor to determine whether rule 406 has been violated.

An exemplary data structure for VM-specific rules 406 is shown in Appendix A, although aspects of the disclosure are not limited to this specific rule structure. Further, an example of a VM rule template is shown below in Table 1.

TABLE 1

Example VM Rule Template.

| Rule | Minimum | Maximum | Average |
|---|---|---|---|
| CPU | 500 MHz | 600 MHz | |
| Memory | 1000 MB | 1500 MB | |
| Network Bandwidth | 0.5 Gb/s | 0.75 Gb/s | |
| Disk (Write Rate) | | 169 | 63.189 KBps |

Memory area 104 may also store host-specific rules (not shown) evaluated by host computing devices 100. The host rules are in addition to the VM rules 406, and may represent more conservative rules (e.g., migrate VM 235 before VM 235 violates its rules 406). An exemplary data structure for the host rules is shown in Appendix B, although aspects of the disclosure are not limited to this specific rule structure. Further, an example of a host rule template is shown below in Table 2.

TABLE 2

Example Host Rule Template.

| Rule | Capacity | Minimum-Maximum Utilization | Average Utilization |
|---|---|---|---|
| CPU | 1000 MHz | 500 MHz-900 MHz | |
| Memory | 5 GB | 2.5 GB-4.5 GB | |
| Network Bandwidth | 1 Gb/s | 0.5 Gb/s-0.9 Gb/s | |
| Disk (Write Rate) | | 0-15000 KBps | 338.587 |

In some embodiments, the VM rules 406 and host rules are defined in terms of minimum values, maximum values, and average values. If the resource consumption of a VM 235 is between the minimum and the maximum values, and the corresponding resource in host computing device 100 is insufficient, migration of VM 235 is initiated. In this manner, over-commitment may be achieved as the gap between the minimum and maximum values may be widened. In the case of average usage, if the average usage over a period is not desirable, the administrator may create rules to migrate VMs 235 if the average is high, even in the presence of rare maximum spikes that occur for a very short duration. This kind of rule (e.g., average utilization) is beneficial, for example, when the minimum and the maximum values are not an accurate reflection of performance. For example, when considering the disk write rate of a host, one or more VMs 235 may be to reduce the average write rate).

Figure 5:
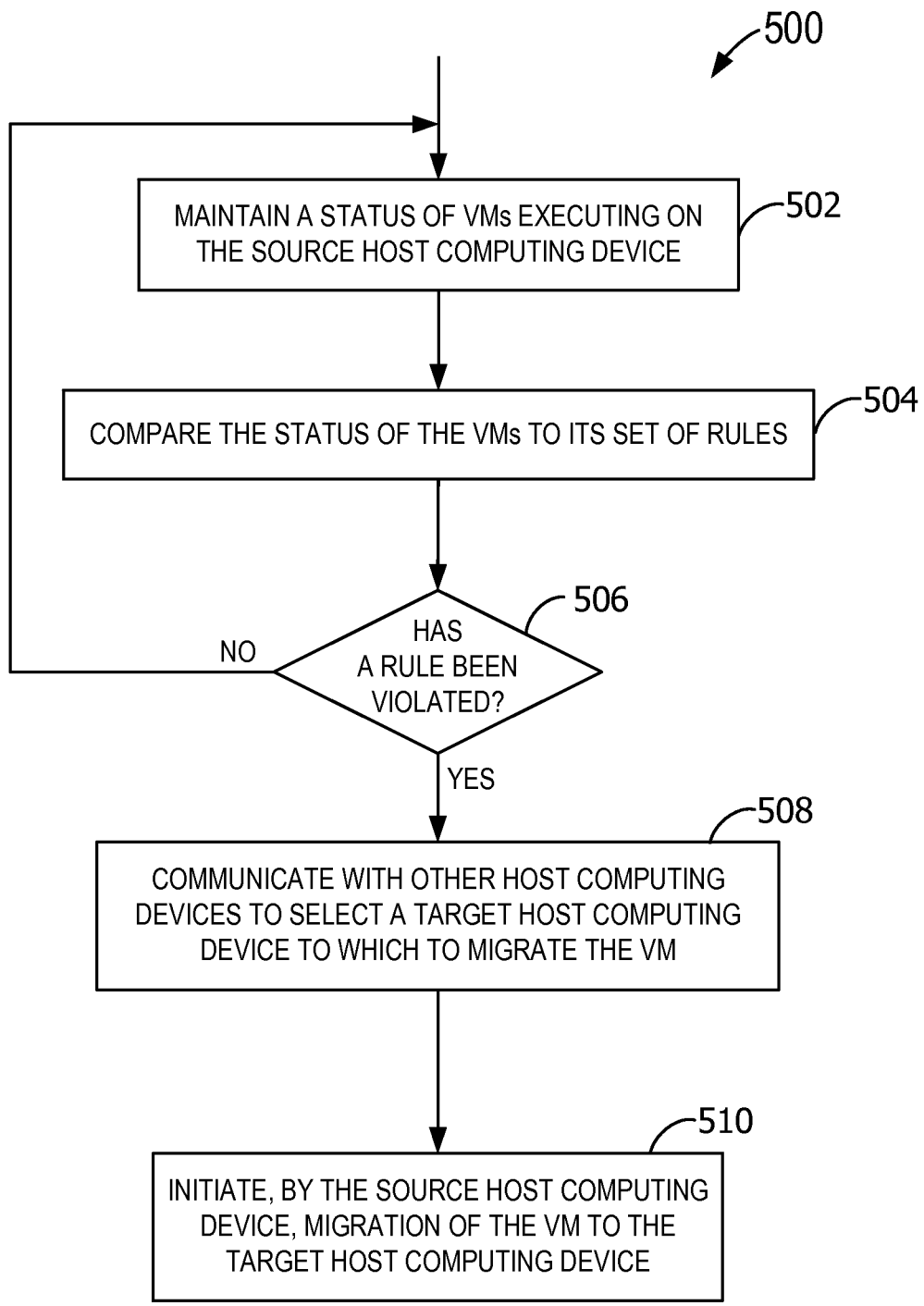
FIG. 5 is a flowchart of an exemplary method performed by a source host computing device to identify virtual machines for migration and to select a target host computing device to receive the identified virtual machines.
Figure 6:
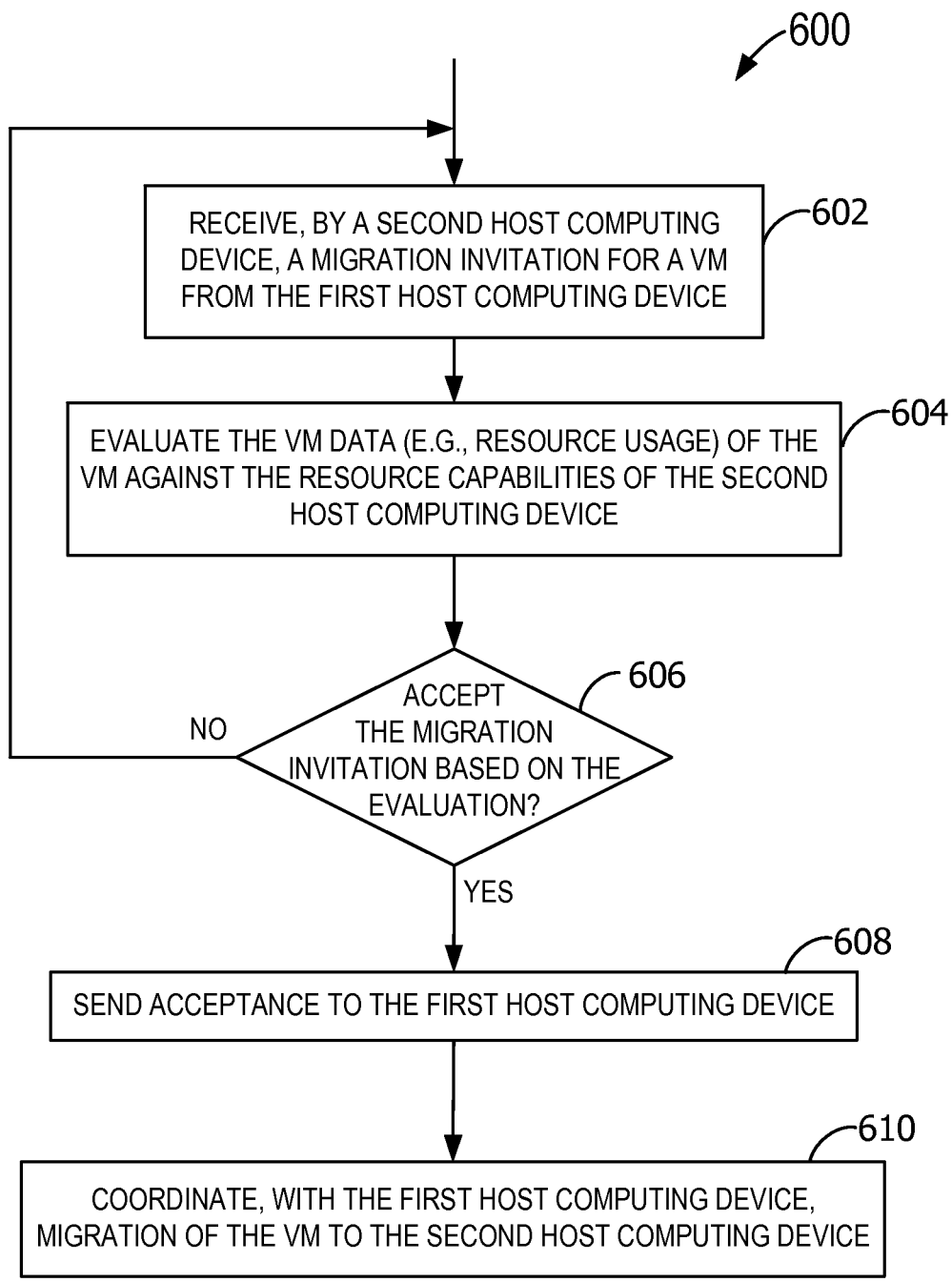
FIG. 6 is a flowchart of an exemplary method performed by a host computing device to accept migration invitations from another host computing device.
Figure 7:
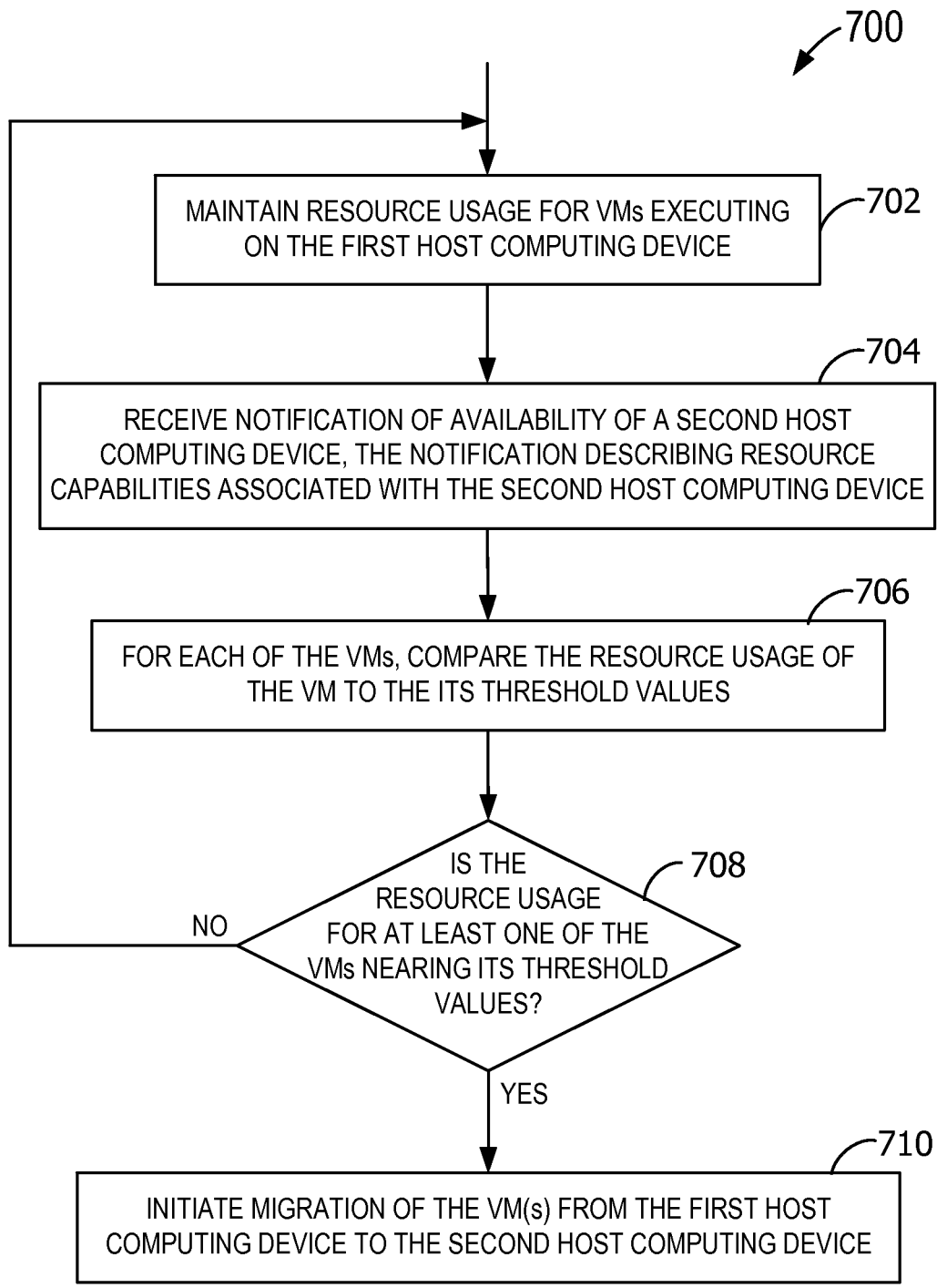
FIG. 7 is a flowchart of an exemplary method performed by a host computing device to identify virtual machines for migration to a newly added host computing device before those virtual machines violate their rules.

The operations illustrated in FIG. 5, FIG. 6, and FIG. 7 and next described may be implemented as computer-executable instructions stored on one or more computer-readable storage media. The operations, when executed by a processor such as processor 102, perform peer-to-peer decentralized management of VM migration. Further, the operations may be performed by any component or module (e.g., a migration module) executing on host computing devices 100. For example, the operations may be executed by a hypervisor, or other VM manager, to proactively perform a VM migration management decision. In another example, a resource scheduler such as the Distributed Resource Scheduler (DRS) from VMware, Inc. may proactively recommend migration to host computing device 100. In some embodiments, the entity performing the operations illustrated in the figures executes in kernel space.

FIG. 5 is a flowchart of an exemplary method 500 performed by a source host computing device to identify VMs 235 for migration and to select a target host computing device to receive the identified VMs 235. While method 500 is described with reference to execution by a source host computing device, it is contemplated that method 500 may be performed by any of host computing devices 100. Further, method 500 may be performed for a plurality of VMs 235 (e.g., each VM 235) executing on the source host computing device. The source host computing device also performs the migration management of method 500 without assistance or input from a centralized server.

At 502, the source host computing device maintains a status of a plurality of VMs 235 executing on the source host computing device. For example, statistics describing the running kernel states of VMs 235 may be maintained. Maintaining the status includes, for example, polling one or more of VMs 235 periodically, intermittently, and/or regularly. For example, a kernel level application executing on the source host computing device may issue input/output control (IOCTL) commands to obtain the values of kernel data structures from kernel modules associated with VMs 235. Maintaining the status may also include receiving the status from one or more of VMs 235. The status includes any statistic describing VM 235 such as prior, current, and/or expected resource usage by VM 235. For example, the source host computing device routinely determines the resource usage of each of VMs 235, such as processor consumption, input/output (I/O) rates, and the like. The source host computing device may also observe constraints in kernel data structures, such as observing a heap shortage for a kernel module. The source host computing device is then able to identify the VM(s) 235 contributing to high resource utilization and mark or tag that VM 235 as a migration candidate, as next described.

At 504, the source host computing device compares the known status of one or more of VMs 235 to the set of rules 406 corresponding to those VMs 235 to identify migration candidates. For example, the status of each VM 235 is compared to threshold values or conditions specified in rules 406 for that VM 235. The comparison may be made regularly, intermittently, or the like. The status represents the current status of VMs 235 to enable demand-based migration because the migration decision is made at the time a rule is violated.

At 506, the source host computing device determines whether any of rules 406 have been, or are being, violated by VMs 235 analyzed at 504. Determining whether a rule violation has occurred includes, for example, determining whether resource usage by VM 235 has exceeded a threshold value from the corresponding set of rules 406 for VM 235. As another example, the source host computing device determines whether a value from the determined status of VM 235 is more than or less than a defined value from the rule threshold value for VM 235 (e.g., whatever constitutes a violation of rules 406), thereby triggering a proactive violation. The rule violation may be triggered by a single violation instance (e.g., a one-time, instantaneous violation), or may be triggered only after continued or repeated violations (e.g., over a threshold period of time, such as one minute).

If one of VMs 235 has, or is, violating at least one of its rules 406, the source host computing device communicates with other host computing devices 100 at 508 to select a target host computing device. The target host computing device represents the host computing device 100 to which to migrate VM 235. That is, upon determining that at least one of rules 406 for at least one of VMs 235 has been violated, the source host computing device negotiates with the other host computing devices 100 to select the target host computing device for migration.

The source host computing device may negotiate the migration in several ways. In one way, the source host computing device communicates with the other host computing devices 100 by, for example, broadcasting a message to each of host computing devices 100 on the same subnet as the source host computing device after operation 506, and/or in any subnets the source host computing device is aware of. An exemplary broadcast message identifies VM 235 to be migrated, along with VM data 408 describing VM 235 (e.g., current resource usage statistics of VM 235, status, etc.). The message may also describe host-specific physical hardware configuration requirements. The broadcast message may be referred to as a migration invitation, and may be sent via a well-defined interface and protocol. The interface defines the structure of the messages. As described with reference to FIG. 6, each of the other host computing devices 100 analyzes the broadcast message to determine whether to accept VM(s) 235 to be migrated. If so, the willing host computing devices 100 reply to the source host computing device with an acceptance message.

In another way, the source host computing device broadcasts a "hello" message within its subnet during initialization of the source host computing device (e.g., when powering on within the subnet). In response to the broadcast message, the other host computing devices 100 in the subnet identify their existence and provide details of their migration capability as well as the migration capabilities of any other host computing devices 100 they are aware of. For example, the other host computing devices 100 may respond with information describing host computing devices 100 in other subnets. Any of host computing devices 100 may later broadcast their unavailability, on demand. The source host computing device maintains a list or set of the known other host computing devices 100. When the source host computing device is ready to migrate at least one of VMs 235 at 506, the source host computing device may contact each of the known host computing devices 100 in the maintained list or set. For example, the broadcast message described above may be sent to host computing devices 100 in the same subnet as the source host computing device, and unicast messages may be sent to host computing devices 100 in different subnets. The unicast messages, in some embodiments, include the same content as the broadcast messages.

The broadcast messages may be sent, in some embodiments, via an application-layer protocol in the transmission control protocol/Internet protocol (TCP/IP) stack. For example, the protocol may include a socket-based protocol to broadcast the message only to other host computing devices 100 in the same subnet (e.g., layer 3, capable of receiving broadcast messages).

The source host computing device may receive a single acceptance, or multiple acceptance messages (e.g., at least two) from the other host computing devices 100. Upon receiving a plurality of acceptances, the source host computing device selects one of host computing devices 100 to be the target host computing device. The source host computing device may select the target host computing device based on the determined status of VM 235, VM data 408 for VM 235, and/or the received acceptances. For example, the source host computing device may select the target host computing device based on any criteria, such as the time the acceptance is received from the accepting host computing device 100 (e.g., the first-received acceptance is selected) and/or characteristics of the accepting host computing device 100 (e.g., whichever host computing device 100 has the most underutilized resources to host VM 235). In the latter example, the acceptance message may identify the resource capability and/or current resource usage of the host computing device 100 sending the acceptance message. For example, the source host computing device may compare the status of VM 235 to be transferred with the resource capability of the accepting host computing devices 100.

Upon selecting the target host computing device, the source host computing device initiates migration of VM 235 to the target host computing device at 510. In some embodiment, the operations illustrated in FIG. 5 are performed to migrate a plurality of VMs 235 to one or more target host computing devices.

FIG. 6 is a flowchart of an exemplary method 600 performed by host computing device 100 to accept migration invitations from another host computing device 100. While method 600 is described with reference to execution by a second host computing device (e.g., a target host computing device), it is contemplated that method 600 may be performed by any of host computing devices 100. The second host computing device also performs the migration management of method 600 without assistance or input from a centralized server.

At 602, the second host computing device receives a migration invitation from at least one of the other host computing devices 100 (e.g., a first host computing device, or source host computing device). The migration invitation represents a request to migrate one of VMs 235. In some embodiments, the migration invitation includes VM data 408 for VM 235 to be migrated.

The second host computing device is able to receive and parse (e.g., decode) the migration invitation, determine a current resource utilization of the second host computing device, and reply to the first host computing device. For example, at 604, the second host computing device evaluates VM data 408 (e.g., resource usage) against characteristics (e.g., resource capabilities) of the second host computing device to determine whether the second host computing device should agree to host VM 235 (e.g., checks for the possibility of accepting VM 235). Evaluation includes determining whether the second host computing device has enough resources to host VM 235 without violating the set of rules 406 associated with VM 235. Evaluation may also include an investigation as to whether the second host computing device should swap one or more of its VMs 235 with VM 235 from the migration invitation. For example, the second host computing device should recommend such a swap if the swap will result in rules 406 in both the first and second host computing devices becoming compliant. The second host computing device may recommend such a swap by, for example, replying to the first host computing device with the recommendation.

At 606, the second host computing device analyzes whether to accept the migration invitation based on the evaluation. Upon determining to accept the migration invitation, the second host computing device sends an acceptance message to the first host computing device at 608. If the first host computing device selects the second host computing device to host VM 235, the second host computing device at 610 coordinates migration of VM 235 from the first host computing device to the second host computing device.

FIG. 7 is a flowchart of an exemplary method performed by host computing device 100 to identify VMs 235 for migration to a newly added host computing device 100 before those VMs 235 violate their rules 406. While method 700 is described with reference to execution by a first host computing device (e.g., a source host computing device), it is contemplated that method 700 may be performed by any of host computing devices 100. Further, method 700 may be performed for a plurality of second host computing devices as those second host computing devices become available (e.g., powered on). The first host computing device also performs the migration management of method 700 without assistance or input from a centralized server.

At 702, the first host computing device maintains resource usage, or other status, of each of VMs 235 hosted on the first host computing device. In some embodiments, VMs 235 are executing. Each of VMs 235 has a set of threshold values, or other rules, conditions, and the like. Exemplary threshold values include limits on the amount of resources to be consumed by VMs 235.

At 704, the first host computing device receives a notification, or otherwise becomes aware, of an availability of a second host computing device. For example, the notification may be broadcast to all host computing devices 100 on the same subnet as the second host computing device. The second host computing device may become available after, for example, being added to the subnet, newly joining the subnet, and/or powering on, thus triggering the notification. In some embodiments, the notification from the second host computing device describes resource capabilities of the second host computing device. Exemplary resource capabilities include, but are not limited to, the types of resources available on the second host computing device (e.g., type of memory, type of processors, type of network adapters, etc.), the amount of resources (e.g., amount of memory, processing speed, network bandwidth, etc.), and the like. In this manner, the second host computing device proactively notifies the other host computing devices 100 of its availability and statistics.

At 706, for one or more of VMs 235 hosted by the first host computing device, the first host computing device compares the resource usage of those VMs 235 to the set of threshold values for those VMs 235. Exemplary resource usage includes processor usage, memory usage, and/or network bandwidth usage. At 708, the first host computing device determines whether any of the evaluated VMs 235 are nearing the associated thresholds. For example, the first host computing device determines whether a particular VM 235 is approaching, close to, just less than, or otherwise nearing any of the thresholds for that VM 235. For example, the first host computing device determines whether resource consumption is a pre-defined percentage less than a threshold. In this manner, the first host computing device is able to identify VMs 235 at risk of violating at least one of the thresholds (e.g., when the resource usage has not exceeded the associated threshold values) before any of the thresholds are actually violated (e.g., before VM 235 becomes non-compliant).

Upon determining by the first host computing device based on the comparison that the resource usage for at least one of VMs 235 is nearing its corresponding threshold value, the first host computing device initiates migration of VM(s) 235 from the first host computing device to the second host computing device at 710. Further, there may be a plurality of the first host computing devices migrating VMs 235 to the second host computing device on or about the same time.

While the operations illustrated in FIG. 7 have been described with reference to the addition of another host computing device 100, the operations may also be executed when any of host computing devices 100 notifies the other host computing devices 100 that it is underutilized (e.g., has extra resource capacity). Migrating VMs 235 to the underutilized host computing devices 100 reduces a total quantity of hosts in the datacenter, thereby reducing energy consumption.

ADDITIONAL EXAMPLES

The following scenarios are merely exemplary and not intended to be limiting in any way.

In one scenario, all messages between host computing devices 100 are sent as part of the payload in a TCP/IP packet. Exemplary message types and formats are shown in Table 3 below.

TABLE 3

Exemplary Message Types and Formats.

| Message Type | Message Format |
| --- | --- |
| Broadcast "Host Power-On Notification" in current subnet | MessageCode1:Src Machine IP: |
| Unicast "Host Power-On Notification" to other Hosts in the different subnet | MessageCode2:SrcMachine IP: |
| Forward-Broadcast "Host Power-On Notification" to this subnet | MessageCode3:SrcMachineIP: |
| Broadcast "Migration-Initialization" in the current subnet | MessageCode4:SrcMachineIP:CandidateVM'sTemplate: |
| Unicast "Migration-Initialization" to other hosts in different subnet | MessageCode5:SrcMachineIP:CandidateVM'sTemplate: |
| Forward-Broadcast "Migration-Initialization" to this subnet | MessageCode6:SrcMachineIP:CandidateVM'sTemplate: |
| Unicast "Migration-Acknowledgment" to source host from interested host | MessageCode7:DestMachineIP: |

In a specific example of the operations illustrated in FIG. 5, listed below is exemplary pseudocode describing the logic performed by each host computing device 100 when making migration decisions.

```
for each VM's template
    for each rule
        if utilization of the resource in the rule is within [min-max]
            if free value of corresponding resource in host is <
            (max - min)
                Mark_Migration_Candidate (this VM)
for each rule of hosts template
    if utilization of the resource in the rule is < min(or, avg)
        // this indicates under-utilization of resource. Under-utilized
        resource
        // makes this host as potential load shedder. Thus, host tries to
        offload all
        // executing VMs to others and enter into power saving mode.
        Mark_Migration_Candidate(each of the executing VM in the
        host)
    if utilization of the resource in the rule is >= Max
        // Over utilization of resource, so search for VM which has
        highest
consumption
        // of this resource.
        VM = Lookup_HighestResourceUtilizingVM(resource in the
        rule)
        Mark_Migration_Candidate(VM)
```

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for maintaining a status of VMs 235 executing on the first host computing device, exemplary means for comparing the status of each of VMs 235 to the associated set of rules 406, exemplary means for determining whether at least one of rules 406 has been violated for at least one of VMs 235 based on the comparison, exemplary means for selecting a second host computing device upon determining that at least one of rules 406 has been violated, and exemplary means for initiating migration of VMs 235 to the second host computing device.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of".

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

APPENDIX A

An exemplary data structure for a VM rule is shown below, along with exemplary rules. In one of the examples, migration is triggered only after violation of two particular rules. In other embodiments, violation of one of the rules may be dependent on violation of other rules.

```
<VMs>
    <VM name="Test VM">
        <Participate value="true" /> <!-- Can be false if the
admin doesn't want this VM to be migrated at any cost. Weights need
not always be used. Move VM if any rule is broken -->
        <RuleSet name="Rule set for Test VM">
```

-continued

```
            <Rule option="Datastore" object="datastore1 (12)"
measurement="Write latency" value=".50" unit="millisecond"
type="average" threshold="+10%" /><!-- Look to move the VM if
average write latency is higher than 0.55 milliseconds -->
        </RuleSet>
    </VM>
    <VM name="Test VM2">
        <Participate value="true" weight="5" /> <!-- In this
case, if any one of the two rules with weight 5 is broken, the VM
will be migrated. Otherwise, we will wait until the sum of the
weights of the broken rules is 5 or above. -->
        <RuleSet name="Rule set for Test VM2">
            <Rule option="Memory" measurement="Granted"
value="8388608" unit="Kilobytes" type="minimum" threshold="NA"
weight="5"/> <!-- Look to move the VM if the host cannot grant 8 GB
of memory -->
            <Rule option="Virtual Disk" object="scsi0:1"
measurement="Read latency" value="0.50" unit="millisecond"
type="average" threshold="+10%" weight="5"/><!-- Look to move
the VM if average write latency is higher than 0.55 milliseconds -->
            <Rule option="Compliance"
property="isolation.tools.vixMessage.disable" value="true"
weight="3"/> <!-- Look to move the VM if
isolation.tools.vixMessage.disable is false, i.e VIX messages from
the VM are not disabled. -->
            <Rule option="Compliance"
property="RemoteDisplay.maxConnections" value="1" weight="2"/> <!--
Look to move the VM if the RemoteDisplay.maxConnections value is not
1 i.e more than 1 remote display connections are possible -->
        </RuleSet>
    </VM>
</VMs>
```

APPENDIX B

An exemplary data structure for a host rule is shown below, along with exemplary rules.

```
<Host>
    <Participate value="true" weight="10" />  <!-- Can be false
if the admin doesn't want the host to participate in VM migration.
Try to move VMs affected (ordered by rule with highest weight that
is broken) once sum of the weights of broken rules is 10 or above --
>
    <RuleSet name="Sample Rule">
        <Rule option="CPU" measurement="Usage in MHz"
value="5000" unit="MHz" type="average" threshold="+5%"
weight="1"/>
<!-- Look for VMs with high average CPU utilization to migrate if
CPU usage hits 5250 MHZ -->
        <Rule option="Disk" object="10.112.72.148"
measurement="Read rate" value="21" unit="KBps" type="average"
threshold="-10%" weight="2"/> <!-- Look for VMs with high average
disk read rate to migrate if average read rate hits 18.9 KBps -->
        <Rule option="Compliance" measurement="Service"
property="TSM-SSH" value="false" weight="4"/> <!-- Look to migrate
VMs that can participate in migration if SSH is not disabled on a
host i.e value is true -->
        <Rule option="Compliance" measurement="Service"
property="TSM" value="false" weight="5"/> <!-- Look to migrate VMs
that can participate in migration if ESXi shell is not disabled i.e
value is True -->
        <Rule option="Compliance" measurement="Network-Summary"
property="Allow Promiscuous" value="false" weight="3"/> <!-- Look to
migrate VMs that can participate in migration if promiscuous mode is
not reject -->
    </RuleSet>
</Host>
```

We claim:

1. A system for decentralized management of virtual machine (VM) migration, said system comprising a first host computing device, the first host computing device including:

a memory area storing a plurality of VMs including a first VM and a second VM, the plurality of VMs executing on the first host computing device, the memory area further storing a set of host-specific rules and, for each of the plurality of VMs, a set of VM-specific rules including a first set of rules for the first VM and a second set of rules for the second VM, wherein each of the first and second set of rules comprises a respective value that is independent of a capacity of the first host, each value indicating a resource requirement, wherein the first set of rules have an expiration time associated therewith; and a processor programmed to:
determine resource usage by the first host computing device and resource usage by the first VM;
compare the determined resource usage by the first host computing device with the set of host-specific rules, and compare the determined resource usage by the first VM with the first set of rules, to determine if at least one rule of the set of host-specific rules or the set of VM-specific rules has been violated;
upon determining that at least one host-specific rule has been violated, selecting a second host computing device for migrating one of the plurality of VMs from the first host computing device to the second host computing device; and
upon determining that at least one VM-specific rule of the first set of rules has been violated, selecting the second host computing device for migrating the first VM from the first host computing device to the second host computing device,
wherein the second host computing device is selected by:
broadcasting VM data for the VM to be migrated to a plurality of host computing devices,
receiving an acceptance from one or more of the plurality of host computing devices, and
selecting the second host computing device from the one or more of the plurality of host computing devices, wherein a VM manager executing on the first host computing device selects the second host computing device without assistance from a centralized server; and
migrating the VM to be migrated from the first host computing device to the second host computing device.

2. The system of claim 1, wherein the VM data for the VM to be migrated comprises the determined resource usage by the VM, an identifier of the VM, and a size of the VM.

3. The system of claim 1, wherein the processor is programmed to determine that the at least one of the rules has been violated upon determining that a value from the determined resource usage exceeds a threshold value from the at least one of the rules.

4. The system of claim 1, wherein the processor is programmed to compare the determined resource usage by the first VM with the first set of rules intermittently.

5. The system of claim 1, wherein the processor is programmed to determine the resource usage by the first VM by periodically receiving the resource usage from the first VM.

6. The system of claim 1, wherein the processor is programmed to determine the resource usage by the first VM by intermittently polling the first VM for the resource usage.

7. The system of claim 1, wherein the processor is programmed to select the second host computing device from the one or more of the plurality of host computing devices that has a greatest amount of underutilized resources.

8. The system of claim 1, wherein the second host computing device, at a time of selection, is a most underutilized host computing device of the system.

9. A method comprising:
maintaining, by a first host computing device, (a) a set of host-specific rules, (b) resource usage by the first host computing device, (c) resource usage by each of a plurality of virtual machines (VMs) including a first VM and a second VM, the plurality of VMs executing on the first host computing device, and (d) a set of VM-specific rules for each of the plurality of VMs, including a first set of rules for the first VM and a second set of rules for the second VM, wherein each of the first and second set of rules comprises a respective value that is independent of a capacity of the first host, each value indicating a resource requirement, wherein maintaining the resource usage by the first VM comprises intermittently polling the first VM for the resource usage by the first VM;
comparing the resource usage by the first host computing device to the host-specific rules;
comparing the resource usage by each of the plurality of VMs to an associated set of VM-specific rules;
determining, by the first host computing device, whether at least one of the host-specific rules and the first set of rules has been violated, based on the comparison, wherein determining whether the at least one of the rules has been violated comprises identifying a violation occurring over a threshold period of time;
upon determining that at least one of the host-specific rules has been violated, selecting a second host computing device for migrating one of the plurality of VMs from the first host computing device to the second host computing device;
upon determining that at least one of the VM-specific rules of the first set of rules has been violated, selecting the second host computing device for migrating the first VM from the first host computing device to the second host computing device, wherein a VM manager executing on the first host computing device performs selecting of the second host computer device by communicating with the plurality of host computing devices, and wherein the VM manager selects the second host computing device without assistance from a centralized server; and
migrating the VM to be migrated from the first host computing device to the second host computing device.

10. The method of claim 9, wherein maintaining the resource usage by each of the plurality of VMs comprises polling each of the plurality of VMs.

11. The method of claim 9, wherein selecting the second host computing device comprises broadcasting data describing the at least one of the plurality of VMs to the plurality of host computing devices.

12. The method of claim 11, wherein selecting the second host computing device further comprises receiving an acceptance from the second host computing device.

13. The method of claim 11, wherein selecting the second host computing device further comprises:
receiving an acceptance from at least two of the plurality of host computing devices; and
selecting the second host computing device from the at least two of the plurality of host computing devices based on a comparison between the resource usage by the at least one of the plurality of VMs and a resource availability at each of the at least two of the plurality of host computing devices.

14. The system of claim 1, wherein determining whether the at least one of the rules has been violated comprises identifying a violation occurring over a threshold period of time.

15. The method of claim 9, wherein the first set of rules have an expiration time associated therewith.

16. One or more computer-readable storage media including computer executable instructions that, when executed, cause at least one processor to perform peer-to-peer decentralized management of virtual machine (VM) migration comprising:
- maintaining, by a plurality of first host computing devices, (a) a plurality of virtual machines (VMs) including a first VM and a second VM, the plurality of VMs executing on the first host computing devices, and (b) a set of VM-specific rules including a first set of rules for the first VM and a second set of rules for the second VM wherein each of the first and second set of rules comprises a respective value that is independent of a capacity of the first host, each value indicating a resource requirement;
- determining resource usage by the first VM;
- identifying the first VM for migration based upon determining that at least one VM-specific rule of the first set of rules has been violated, wherein the resource usage has not exceeded an associated threshold value before migration, wherein the resource usage is at most a configured percentage less than an associated threshold value;
- upon a second host computing device identifying itself as underutilized, receiving, by at least one first host computing device, a request from the second host computing device that the at least one first host computing device migrate at least one identified VM from the at least one first host computing device to the second host computing device;
- selecting the second host computing device for migrating the first VM from the at least one first host computing device to the second host computing device, wherein a VM manager executing on the at least one first host computing device selects the second host computing device without assistance from a centralized server; and
- migrating the at least one identified VM from the at least one first host computing device to the second host computing device.

17. The computer storage media of claim 16, wherein the identification of the second host computing device as underutilized is triggered by the second host computing device joining a subnet of the first host computing device.

18. The computer storage media of claim 16, wherein the resource usage describes at least one of processor usage, memory usage, or network bandwidth usage.

19. The computer storage media of claim 18, wherein the computer executable instructions represent performance of a VM migration decision by a hypervisor executing on the first host computing device.

* * * * *